United States Patent
Angerer et al.

(10) Patent No.: US 11,344,988 B2
(45) Date of Patent: May 31, 2022

(54) BENDING MACHINE HAVING A BENDING INFORMATION DISPLAY DEVICE

(71) Applicant: TRUMPF Maschinen Austria GmbH & Co. KG., Pasching (AT)

(72) Inventors: Gerhard Angerer, Altenberg (AT); Thomas Denkmeier, Traun (AT); Klemens Freudenthaler, Linz (AT); Florian Hausmann, Traun (AT); Matthias Hoerl, Linz (AT); Nenad Kovjenic, Linz (AT); Florian Maier, Leonding (AT); Helmut Theis, Pfarrkirchen (AT); Manfred Waldherr, Linz (AT)

(73) Assignee: TRUMPF Maschinen Austria GmbH & Co. KG, Pasching (AT)

( * ) Notice: Subject to any disclaimer, the term of this patent is extended or adjusted under 35 U.S.C. 154(b) by 693 days.

(21) Appl. No.: 16/325,986

(22) PCT Filed: Aug. 30, 2017

(86) PCT No.: PCT/AT2017/060210
§ 371 (c)(1),
(2) Date: Feb. 15, 2019

(87) PCT Pub. No.: WO2018/039694
PCT Pub. Date: Mar. 8, 2018

(65) Prior Publication Data
US 2021/0354260 A1 Nov. 18, 2021

(30) Foreign Application Priority Data
Sep. 2, 2016 (AT) .............................. A 50782/2016

(51) Int. Cl.
*B23Q 17/24* (2006.01)
*B21D 5/00* (2006.01)
*B21D 5/02* (2006.01)

(52) U.S. Cl.
CPC ............. *B23Q 17/24* (2013.01); *B21D 5/002* (2013.01); *B21D 5/02* (2013.01)

(58) Field of Classification Search
CPC .......... B21D 5/002; B21D 5/02; B21D 55/00; B23Q 17/24; F16P 3/14; F16P 3/142; F16P 3/144; G05B 2219/45143; G03B 21/145
(Continued)

(56) References Cited

U.S. PATENT DOCUMENTS 7,448,241 B2  11/2008  Davies
8,356,902 B2  1/2013  Paulussen et al.
(Continued)

FOREIGN PATENT DOCUMENTS

AT   508 310 A1   12/2010
AT   510 950 A2   7/2012
(Continued)

OTHER PUBLICATIONS

International Search Report in PCT/AT2017/060210, dated Feb. 1, 2018.
(Continued)

*Primary Examiner* — Jessica Cahill
*Assistant Examiner* — Smith Oberto Bapthelus
(74) *Attorney, Agent, or Firm* — Collard & Roe, P.C.

(57) ABSTRACT

A bending machine with a bending information display apparatus has a machine frame, a longitudinally extended, fixed machine table, and a longitudinally extended press beam. The longitudinal expanse and the press beam movement direction define a working plane. An insertion plane
(Continued)

essentially normal to the working plane is defined by an upper machine table flat side or a lower tool disposed thereon. The working plane establishes a front working and manipulation space and a closed rear machine space. A projector disposed above the insertion plane in the rear machine space has a light beam path directed away from the insertion plane. A reflector disposed in the working and manipulation space has a first reflective surface pivotable by an angle to the horizontal so that a light beam incident from the projector beam path leaves the first reflective surface as a departing light beam toward the insertion plane.

19 Claims, 5 Drawing Sheets (58) Field of Classification Search
USPC .............................................. 72/19.6; 353/119
See application file for complete search history.

(56) References Cited

U.S. PATENT DOCUMENTS

| | | | |
|---|---|---|---|
| 9,415,477 | B2 | 8/2016 | Tauchmann et al. |
| 9,547,300 | B2 * | 1/2017 | Angerer ................. G05B 19/19 |
| 9,561,571 | B2 | 2/2017 | Wielens et al. |
| 2010/0214539 | A1 * | 8/2010 | Cheng ..................... G03B 21/28 |
| | | | 353/98 |
| 2016/0151820 | A1 | 6/2016 | Woidasky |

FOREIGN PATENT DOCUMENTS

| | | | |
|---|---|---|---|
| AT | 511 557 A1 | | 12/2012 |
| CN | 1659405 A | | 8/2005 |
| CN | 1883841 A | | 12/2006 |
| CN | 1942260 A | | 4/2007 |
| CN | 201316751 Y | | 9/2009 |
| CN | 101802707 A | | 8/2010 |
| DE | 10 2008 014 869 A1 | | 9/2009 |
| DE | 10 2010 016646 A1 | | 11/2010 |
| EP | 2 590 040 B1 | | 5/2013 |
| EP | 2 639 012 B1 | | 9/2013 |
| JP | H01271012 A | | 10/1989 |
| JP | 2001-025823 A | | 1/2001 |
| JP | 2004-017072 A | | 1/2004 |
| JP | 2004-025237 A | | 1/2004 |
| JP | 2004017072 | * | 1/2004 |
| JP | 2004-174500 A | | 6/2004 |
| JP | 2004-202506 A | | 7/2004 |
| JP | 2005-021978 A | | 1/2005 |
| JP | 2006-061958 A | | 3/2006 |
| JP | 2006-297469 A | | 11/2006 |
| JP | 3908097 B2 | | 4/2007 |
| JP | 4743688 B2 | | 8/2011 |
| JP | 5856860 B2 | | 2/2016 |
| JP | 2016-043373 A | | 4/2016 |
| JP | 2016/530102 A | | 9/2016 |
| WO | 03/035294 A1 | | 5/2003 |

OTHER PUBLICATIONS

International Search Report in PCT/AT2017/060211, dated Jan. 24, 2018.

International Search Report in PCT/AT2017/060212, dated Feb. 1, 2018.

* cited by examiner

Fig.4

BENDING MACHINE HAVING A BENDING INFORMATION DISPLAY DEVICE

CROSS REFERENCE TO RELATED APPLICATIONS

This application is the National Stage of PCT/AT2017/060210 filed on Aug. 30, 2017, which claims priority under 35 U.S.C. § 119 of Austrian Application No. A 50782/2016 filed on Sep. 2, 2016, the disclosure of which is incorporated by reference.

The international application under PCT article 21(2) was not published in English.

BACKGROUND OF THE INVENTION

1. Field of the Invention

The invention relates to a bending machine having a bending information display apparatus.

2. Description of the Related Art

In the case of machine tools such as bending machines, for example, an operator must perform adjustment, feed, and manipulation actions during proper use or proper utilization. In this regard, the operator must direct his/her attention to different aspects of the bending process or of the bending machine and its surroundings, essentially simultaneously. Specifically in the case of complicated bending processes, this can lead to great mental stress of the operator, and over an extended period of time this leads to general stress, which ultimately increases the likelihood of incorrect operation. A bending machine generally has an operation terminal, on which configuration data or adjustment data and, in general, also a visualization of the next work step to be performed are presented. Preferably, this operation terminal is disposed in the lateral region of the machine or can be configured to be mobile and thereby be positioned in the region in front of the bending machine. Even though this already represents an easier way to work, it is nevertheless necessary that a machine operator must constantly direct his/her eyes and therefore his/her attention to different regions. However, a constant change in the point of attention, in particular, leads to severe fatigue of the operator.

A bending machine is known from the prior art, for example from EP 2 590 040 B1, in which two cameras are disposed on the press beam and, in particular, in the region of the working and manipulation space in front of the press beam. These cameras record the work region in front of the machine, in particular the metal sheet that has been inserted into it. The recorded image is transmitted to a data processing device. This device evaluates in what orientation the metal sheet was inserted into the bending machine. In the case of an incorrect orientation of the metal sheet for the next bending step to be carried out, position correction information is drawn up and projected onto the metal sheet by a projector, which projector is also disposed on the press beam in the front working and manipulation space. Therefore the operator is given a representation in front of him/her on the metal sheet as to the direction in which the metal sheet must be moved so as to be inserted into the bending machine correctly for the next work step.

EP 2 639 012 B1 shows a metal-processing machine in which a projector is disposed outside of the processing space, which projector projects processing and machine data onto a projection surface in the machine space.

A bending machine is known from JP 4743688 B2, in which a projector is disposed in the work region in front of the machine, and by means of which projector a positioning apparatus is displaced along the press beam.

A similar embodiment is also shown by JP 3908103 B2; here, too, a projector is moved by means of an apparatus, in front of the press beam and in the longitudinal direction of the press beam, and projects its image onto the front surface of the press beam.

A bending machine is known from JP 3908097 B2, in which two projectors are disposed in the front region of the bending machine, so as to be longitudinally displaceable on positioning apparatuses, and project a common image onto the press beam. A camera is disposed on a positioning apparatus in the machine interior space, and can be moved along the press beam and, furthermore, pivoted or rotated about the Z axis.

In the case of the previously known systems, the projector or an installation or manipulation apparatus is disposed in the region in front of the machine. In most cases, the installation or manipulation apparatus is disposed on the press beam and thereby moves along with it during a bending process. However, placement in the region in front of the bending machine has the decisive disadvantage that manipulation actions during insertion or removal of the metal sheet take place here. Furthermore, bending upward of the metal sheet takes place during the bending process, wherein bending upward up to the press beam is possible as a mechanical limit. Insertion or removal of the metal sheet takes place with a crane, in particular with an indoor crane, in particular in the case of larger and heavier metal sheets, so that the metal sheet is inserted from above and removed upward. Now a particularly great risk of damage exists due to manipulation actions or due to the metal sheet being bent upward, for an apparatus disposed in this region, in front of the press beam, or projecting into this region, such as the previously known installation or positioning apparatus, for example.

From the prior art, for example EP 2 639 012 B1, it is known to dispose a projector in the lateral region of the machine. A similar solution with two projectors is also shown by JP 390809 B2, wherein here, the two projectors are disposed so as to be displaceable, in parallel, relative to the longitudinal expanse of the press beam. Placement of a projector in the lateral region of a bending press would reduce the problems with regard to damage due to manipulation actions. However, in the case of such an arrangement, there is a problem due to distortions caused by the projection distance or the arrangement. This problem becomes all the more massive, the greater the longitudinal expanse of the press beam. If projectors are affixed on both sides of the bending press, this means increased effort, on the one hand, and, at the same time, doubles the risk of damage to the projector. The problems caused by the great distortions during projection cannot be solved even with such an embodiment; in particular, the problem of great distortions in the case of a large press beam exists here, as well.

A sheet metal insertion aid is known from JP 5856860B2, in which a camera in the machine space is directed at the rear stop and the inserted metal sheet. In the recorded image, a sheet metal edge or a distinctive point of the metal sheet is determined and compared with a reference position. In the event of a deviation, a projector projects a marking onto the metal sheet, with which marking the metal sheet must be oriented with reference to the rear stop. The camera and the projector are affixed to an apparatus that can be moved parallel to the press beam.

SUMMARY OF THE INVENTION

The task of the invention now consists in equipping a bending machine with an apparatus for representing bending information, wherein the representation apparatus cannot be endangered or damaged by proper use of the bending machine. The task of the invention also consists in eliminating the problems known from the state of the art with regard to representation along a long press beam, and in allowing projection of relevant bending information along the press beam, without distortions, to the greatest possible extent.

The task of the invention is accomplished by a bending machine having a bending information display apparatus, wherein the bending machine has a machine frame and a longitudinally extended machine table, fixed in place, and a longitudinally extended press beam, which press beam is guided in the machine frame and held by a drive means, so as to be movable relative to the latter. The longitudinal expanse and the movement direction of the press beam define a working plane; furthermore, an insertion plane is defined essentially normal to the working plane and by an upper flat side of the machine table or of a lower tool disposed on it. The machine frame furthermore has two side parts, which are spaced apart from one another by a machine width in the direction of the longitudinal expanse of the machine table and of the press beam. Also, the working plane establishes a front working and manipulation space and a rear machine space, distinguished from the former and, in particular, closed off. A projector is disposed in the rear machine space and above the insertion plane, which projector has a light beam path directed away from the insertion plane, in particular a light beam path directed upward. Furthermore, a reflector having a first reflective surface is disposed in the working and manipulation space. The first reflective surface is disposed so as to be pivoted by an angle relative to the horizontal, so that a light beam impacting it from the light beam path of the projector departs from the first reflective surface as a departing light beam of a light beam path of the projector in the direction of the insertion plane.

Due to the usual orientation of the bending machine, the working plane is oriented vertically and the insertion plane is oriented horizontally. In the case of a lower tool disposed in the machine table, the insertion plane is oriented at a distance parallel to the machine table, wherein the distance is established by the height of the working edge of the lower tool above the machine table.

A light beam path directed away from the insertion plane is particularly understood to mean that the light beam emitted by the projector can get to the insertion plane along the light beam path, not in a direct way.

With this embodiment, the result is achieved, in advantageous manner, that a projector is disposed in a protected region, and that the bending press cannot be damaged by the proper forming work, or that this is extremely unlikely. All of the front-end parts in the working and manipulation space are constantly exposed to the hazard of damage due to set-up work, material delivery and removal, and due to the metal sheet bending upward.

Another advantage of the present embodiment is that as a result, the light beam path comes from above (from the upper region of the bending machine), and the descending light beam path is therefore not impaired by working and operation actions, or only impaired slightly; in particular, it is unlikely that the operator will cast a shadow.

According to a further development, it is provided that the projector and/or the reflector is/are disposed on the machine frame in a pivoting apparatus, so that the light beam path can be oriented over a section along the longitudinal expanse. With this embodiment, it is possible, in advantageous manner, to direct the light beam path in such a manner, from a placement position of the projector, that at least a partial section of the width of the machine, which extends in the longitudinal direction, can be achieved. For example, it is possible to dispose the projector in the region of the center of the machine width, so as to thereby be able to direct the light beam path away from the center to lateral regions.

According to a further development, it is also provided that the projector and/or the reflector is/are disposed on a side part or in the region of the side parts. This has the advantage that the projection is thereby protected, at least in part, by the side parts of the machine frame, which are mostly solid. Also, in this region of the machine, the space conditions are generally more advantageous, so that the projector can be disposed there.

A further development also consists in that the machine table and/or a metal sheet to be formed, which is disposed on the insertion plane, and/or a floor surface in the front working and manipulation space and/or a surface of a bending tool disposed in the press beam form a first display surface. This embodiment has the advantage that existing surfaces in the working region or the workpiece itself can be used as a projection surface. The metal sheet as a display surface has the advantage that relevant bending information can be represented directly on the workpiece, so that the operator does not need an additional viewing step so as to acquire the information. The floor as a projection surface in turn has the advantage that the relevant bending information is already represented when stepping toward the machine or when inserting the metal sheet into the machine. In particular, however, it is advantageous that due to the specific projection, all of the surfaces present, which are essentially oriented horizontally, can be used as display means.

A further advantageous embodiment consists in that the projector and/or the reflector is disposed so as to be movable in a guide disposed oriented parallel to the longitudinal expanse. Since a bending press might have a great longitudinal expanse and processing steps are performed along this longitudinal expanse, this further development has the advantage that the projector and/or the reflector can be moved to the respective location of the next processing step. Therefore the optics of the projector can be structured to be simpler and lower in distortion, since the region that must be covered is not as great.

In this regard, a further development according to which the projector and/or the reflector is/are connected with the guide in terms of movement, by way of a drive means, is also advantageous. In this way, it becomes possible, for example, that a machine controller controls the movement or positioning of the projector and/or of the reflector. In general, a bending plan will be stored in the memory of the machine controller, which plan also establishes the sequence of the individual bending steps. Therefore the projector and/or the reflector can be moved to the position of the next work step to be performed, before every work step. As a result, the operator receives the clear information regarding the tool setup position along the longitudinal expanse at which the subsequent forming step takes place.

Furthermore, a further development according to which the reflector has a second reflective surface is advantageous, wherein the first and the second reflective surface are disposed within the light beam path of the projector, and the surface normal line vectors of the two surfaces enclose an angle relative to one another.

According to a further embodiment, it is provided that the press beam forms a second display surface. Since the press beam generally has a large and usually a mostly flat surface, this surface is advantageously suitable as a projection surface. In particular due to the fact that this surface can also be viewed by the operator standing in front of the bending machine during the insertion process and also during the bending process.

A further development also consists in that the reflector is disposed in a holding apparatus, which holding apparatus can be moved between a protection position and a work position. Sheet-metal parts, for example, have to be moved into and in the working and manipulation space in front of the machine, so as to be able to insert them into the bending press. This is done by hand in the case of small parts, but delivery with a forklift and/or an indoor crane is also possible. However, this brings with it a significant risk of damage due to this manipulation work for all of the front-end parts and attached parts of the bending press that are situated in the working and manipulation space. For example, the protection region can be established in such a manner that the holding apparatus then does not project into the working and manipulation space, or only projects minimally, and thereby is protected against damage caused by proper manipulation actions.

To this effect, it is provided, according to a further development, that the holding apparatus is disposed behind the working plane, in particular in the region of the rear machine space, in the protection position. With this further development, it is guaranteed that during proper manipulation work, the region in front of the machine is kept completely clear, and the holding apparatus is therefore protected in the best possible way.

To this effect, a further development also consists in that the holding apparatus is disposed above the projector in the protection position. In this way, protection of the projector by the holding apparatus, which is disposed above it according to the claims, is achieved in addition to the protection of the holding apparatus as described above.

According to a further development, it is provided that the projector is formed by a laser having a deflection unit. A laser or, in general, a light source that emits a strongly directed beam has the advantage that the information to be represented on the display surface is well distinguished from the background.

A further development also consists in that the projector is connected with a machine controller and/or a process guide system, and that a data-technology connection exists with a work preparation system or CAD system. In this way, it is possible, in advantageous manner, to transmit work data and, in particular, information regarding every individual bending step directly to the bending machine, or to have it picked up directly by the bending machine.

A further development consists in that the bending information is formed by at least one of the group of workpiece contour, bending line, control panel, status data of the press beam, orientation information, reference angle, piece counter, and regions on the sheet metal to be formed that potentially increase risk of injury during the bending process. In particular, all bending program data can be visualized. It can be guaranteed, by means of the workpiece contour, that it can be unambiguously and clearly represented to the operator how a workpiece must be inserted into the bending press for the next processing step. In the case of manipulation processes, the metal sheet must be grasped by the operator, wherein it is possible, using the present further development, to visualize those regions of the workpiece in which a risk of injury caused by the metal sheet to be formed exists during the bending process.

An advantageous further development also consists in that the bending information comprises animated orientation information. Specifically when processing small numbers of items, the problem always exists that an operator is not familiar with the manipulation steps of the metal sheet. As a result, a clear reduction in throughput can occur and/or the risk of incorrect operation or incorrect orientation increases, and this generally leads to a defective part. According to this further development, it is possible to show those necessary steps for bringing the workpiece to be formed from one processing position into the next processing position. This comprises not only the orientation of the workpiece with reference to the bending line, but also the station at which the subsequent bending step must be performed.

According to a further development, the first and/or the second display surface is/are configured at discrete positions along the longitudinal expanse. This has the advantage that the information relating to the bending process is displayed to an operator directly at the location of the next processing step.

A further development, according to which a light beam deflection apparatus is disposed in the light beam path of the projector, has the advantage that in this way, projection along the longitudinal axis is nevertheless possible, with a projector that is fixed in place with reference to the bending machine, without a strong wide-angle lens having to be affixed on the projector, which lens would cause image distortions.

A further development, according to which a position-locating apparatus and/or a command issuance apparatus is/are connected with the machine controller, is also advantageous. This further development has the advantage that the position of an operator in the working and manipulation space in front of the bending machine can be determined. The machine controller can therefore recognize a dangerous situation, for example, and stop a bending process or not trigger it, if necessary.

To this effect, it is advantageous if the connection is configured to be wireless, in particular by way of wireless and/or sound, in particular ultrasound. The use of cables in the work region represents a not insignificant safety risk due to the risk of tripping connected with that. A cable-free connection is therefore advantageous, since the freedom of movement of the operation is therefore also not restricted as a result.

According to a further development, it is provided that the position-locating apparatus and/or command issuance apparatus is formed by an article of clothing, in particular a shoe. For example, the shoe can be configured as described in AT 510 950 A2.

BRIEF DESCRIPTION OF THE DRAWINGS

For a better understanding of the invention, it will be explained in greater detail below, using the following figures.

The figures show, each in a greatly simplified, schematic representation.

DETAILED DESCRIPTION OF THE PREFERRED EMBODIMENTS

Figure 1:
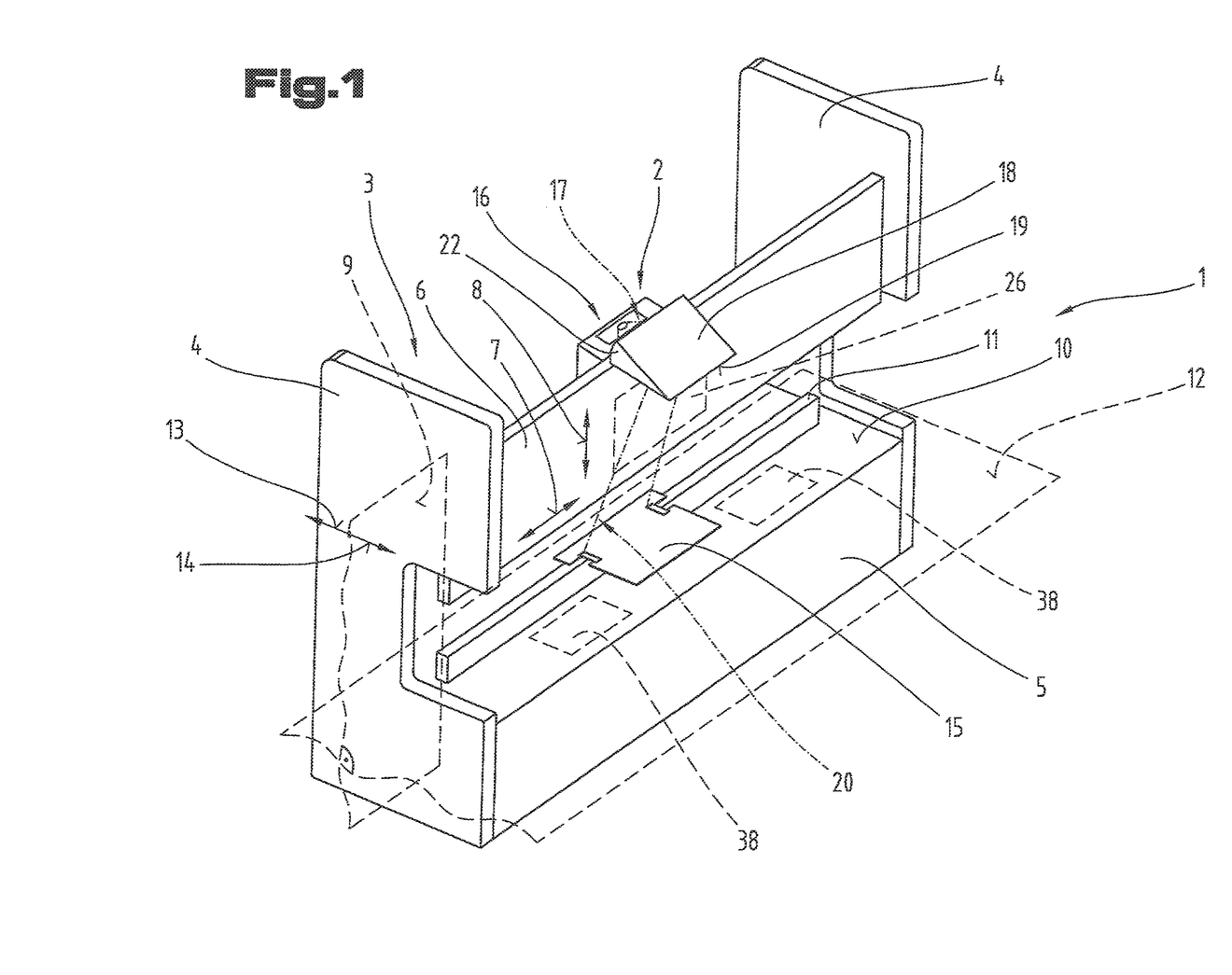
FIG. 1 a simplified perspective representation of an embodiment of the bending machine with a bending information display apparatus.

FIG. 1 schematically shows a present bending machine 1 with a bending information display device 2. The bending machine 1 has a machine frame 3 having two side parts 4 and a machine table 5. Furthermore, a press beam 6 is held in the machine frame 3 and guided so as to move relative to the machine frame 3, wherein the relative movement is carried out by a drive means, not shown. The longitudinal expanse 7 and the movement direction 8 of the press beam 6 define a working plane 9. An insertion plane 12 is defined normal to this, by an upper flat side 10 of the machine table 5 or by a lower tool 11 disposed on the machine table 5. A rear machine space 13 and a front working and manipulation space 14 are established by the working plane 9. All operating actions of the bending machine 1 and all manipulation actions of the sheet-metal part 15 to be formed take place in the front working and manipulation space 14.

A projector 16 is disposed in the rear machine space 13 and above the insertion plane 12, which projector has a light beam path 17 that is directed away from the insertion plane 12. In particular, this projector light beam path 17 can be directed upward, horizontally or at a slant downward, wherein, however, a light beam of the projector light beam path 17 cannot reach the insertion plane 12 by a direct path in the region of the machine table 5. For this reason, a reflector 18 with a first reflective surface 19 is furthermore disposed in the working and manipulation space 14. In this regard, the first reflective surface 19 is disposed pivoted relative to the horizontal about an angle, so that a light beam coming in from the light beam path 17 of the projector 16 departs from the first reflective surface 19 as an outgoing light beam of a beam path 20 of the reflector 18.

A distinctive contour of the workpiece is projected onto the sheet-metal part 15, for example, so as to thereby be able to indicate the correctly oriented insertion position to the operator. However, aside from a projection onto the sheet-metal part 15, it is also possible to project onto the flat side 10 of the machine table 5.

Figure 2:
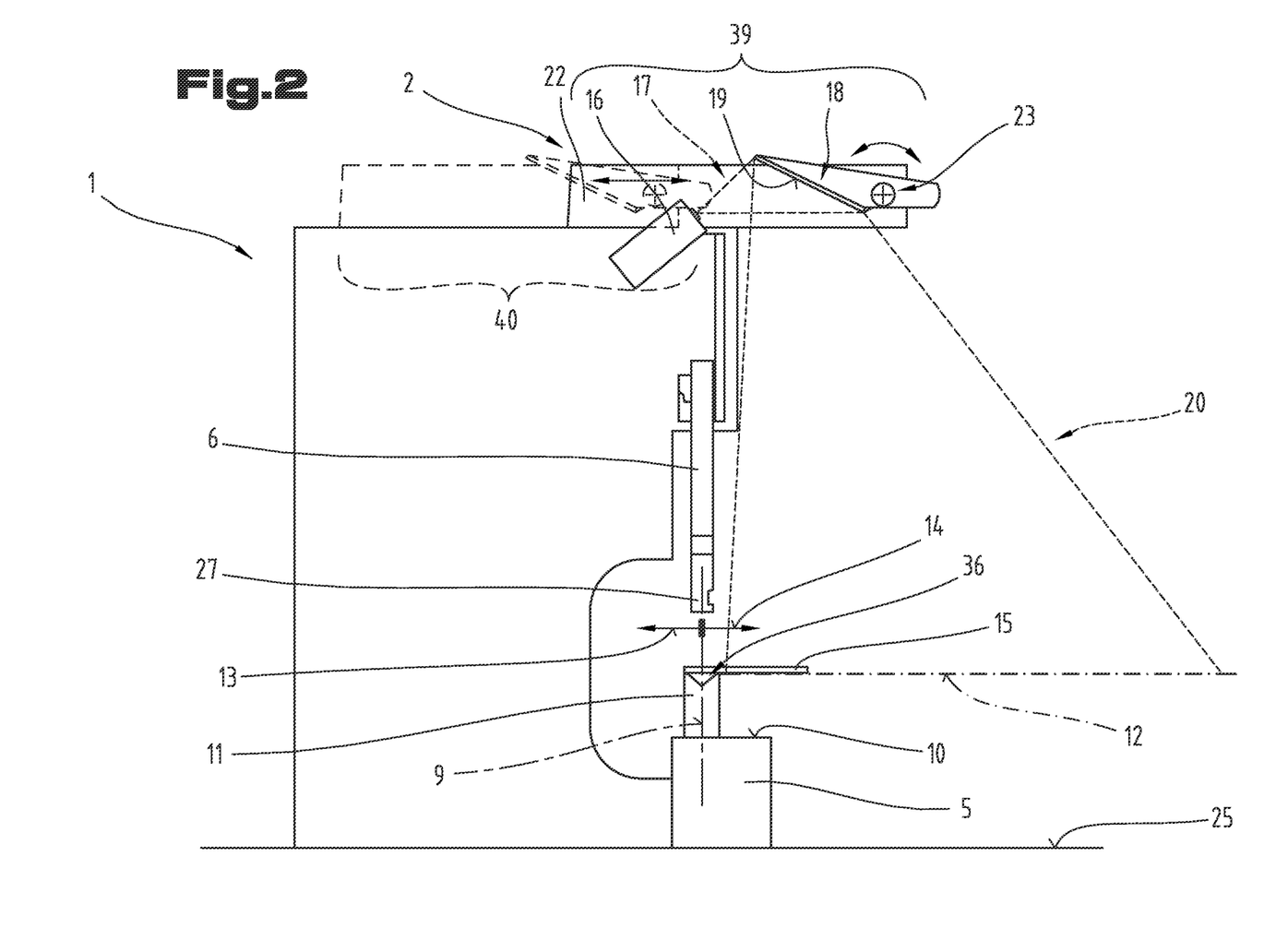
FIG. 2 a side view of an embodiment variant of the bending machine with a bending information display apparatus.

FIG. 2 shows a side view, in a cross-sectional representation, of the bending machine 1, in particular to make the placement of the projector 16 and of the reflector 18 of the bending information display apparatus 2 clear. In this regard, the viewing direction is selected to be parallel to the working plane 9 and the insertion plane 12; the intersection point of the two planes represents the bending line 36, in other words the line at which an upper tool 27 disposed on the press beam 6 contacts an inserted sheet-metal part and presses on a lower tool 11 disposed in the machine table 5.

In this regard, the projector 16 is disposed in such a manner that the light beam path 17 emitted by the projector 16 is not oriented in the direction of the insertion plane 12. In particular, a reflector 18 having a first reflective surface 19 is disposed in the light beam path 17 of the projector 16, which reflector or which reflective surface 19 deflects a light beam coming in from the light beam path 17 of the projector 16 into an outgoing light beam of the light beam path 20 of the reflector 18. The outgoing light beam path 20 of the reflector 18 is guided in the direction of the insertion plane 12 or of the machine table 5, and impacts a projection surface there, which is oriented horizontally, to the greatest possible extent. The projection surface can now be formed by the sheet-metal part 15 disposed in the insertion plane 12 or by a flat side 10 of the machine table 5, which side is oriented horizontally, to the greatest possible extent. However, it is also possible that the projection takes place on the floor 25 in front of the bending machine 1, wherein combinations of the individual projection possibilities are also possible.

Figure 3:
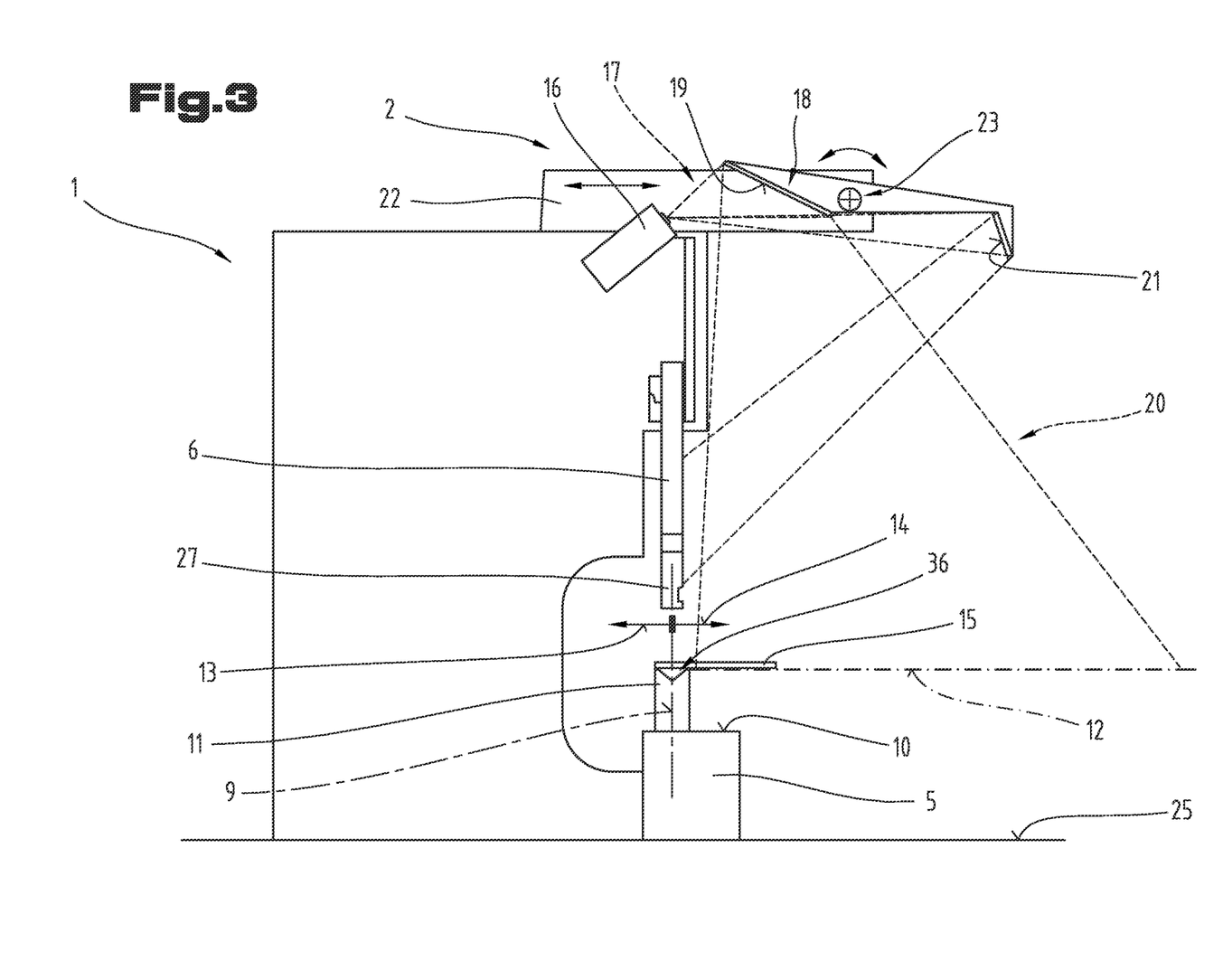
FIG. 3 a side view of a further embodiment variant of the bending machine with a bending information display apparatus.

FIG. 3 shows a further possible embodiment of the bending information display apparatus 2 on a bending machine 1. In this embodiment, the reflector 18 has not only the first reflective surface 19 but also a second reflective surface 21, wherein the surface normal lines to the two reflective surfaces 19, 21 enclose an angle relative to one another. Preferably, the plane defined by the surface normal lines will be oriented normal to the working plane 9 and normal to the insertion plane 12. From the projector 16, the light beam path 17 is issued in the direction of the reflector 18 and thereby in the direction of the first 19 and second 21 reflective surface. In particular, it is provided that only a common light beam path 17 is issued by the projector 16 in the direction of the reflector 18. The reflector 18 is preferably disposed in a holding apparatus 22, wherein the latter is only shown schematically in FIGS. 2 and 3. This holding apparatus 22 can be configured as a pivoting apparatus, for example, and makes it possible to pivot the reflector 18 about an axle 23 that is parallel to the working plane 9 and to the insertion plane 12. According to a further embodiment, the reflector 18 can be held in a pivoting apparatus that allows pivoting of the reflector 18 or of the axle 23 about an axis normal to the working plane.

In an embodiment according to FIG. 2, a pivoting apparatus allows displacement of the projected image, for example between the machine table 5, the sheet-metal part 15 and/or the floor. In the case of corresponding pivoting, however, it is also possible to project the image onto the press beam 6.

Since the risk of damage due to manipulation actions on the sheet-metal part 15 or due to the metal sheet bending upward always exists for an apparatus disposed in the front working and manipulation space 14, it can be provided, according to a further embodiment, that the holding apparatus 22 is configured in such a manner that the reflector 18 can be moved between a work position 39 and a protection position 40. In the work position 39, the reflector 18 is disposed in the working and manipulation space 14, as shown in FIGS. 2 and 3; for manipulation actions with the sheet-metal part, particularly when inserting the sheet-metal part 15 into the bending machine 1 or removing it, the reflector 18 can be moved into the protection position 40. In the protection position 40, the reflector is disposed in the region of the rear machine space 13 and thereby protected against damage caused by moving parts in the front region of the bending machine. According to a further embodiment, it can furthermore be provided that the reflector is disposed above the projector 16 in the protection position 40, and therefore can also protect the latter against damage.

Figure 4:
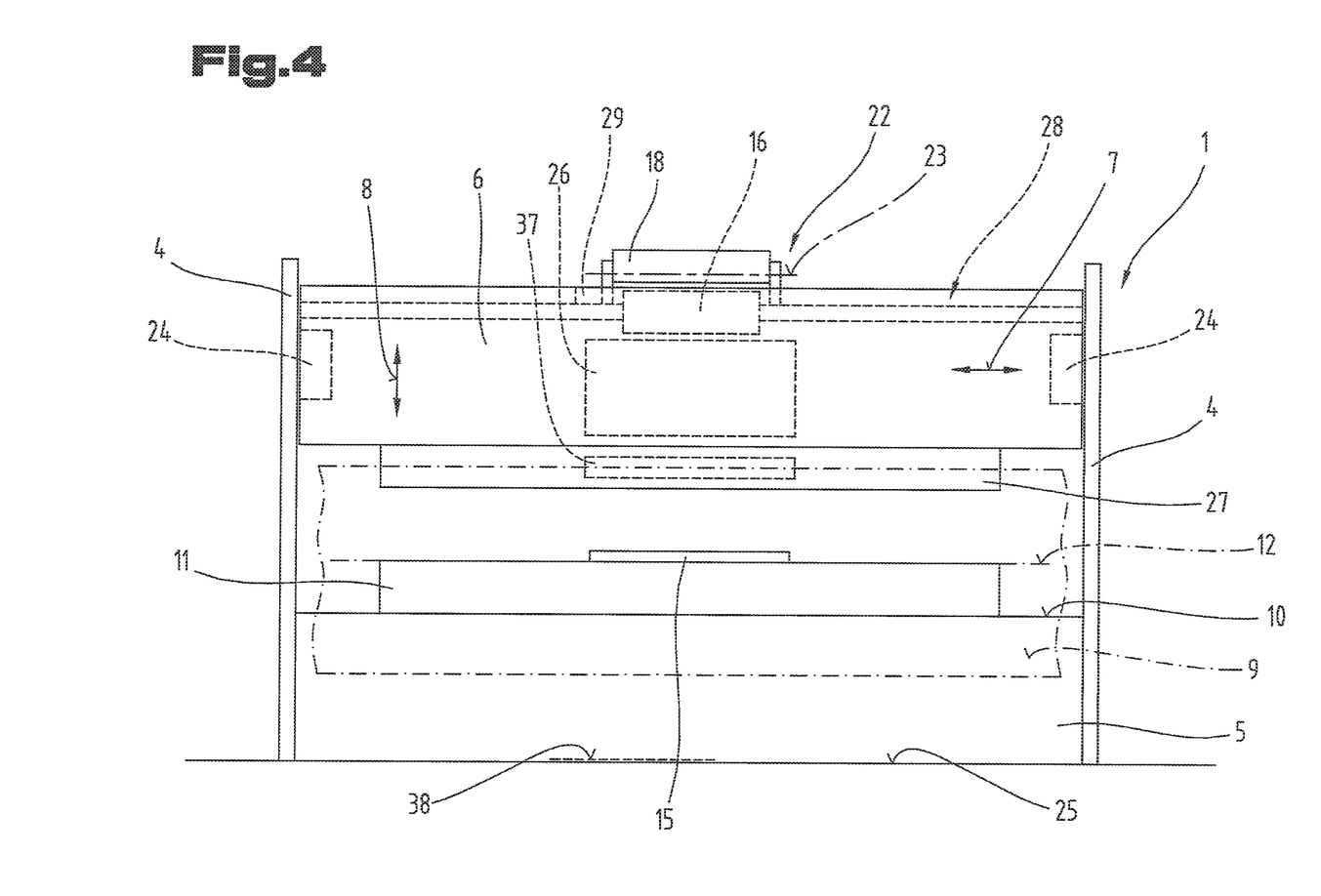
FIG. 4 a front view of a further embodiment variant of the bending machine with a bending information display apparatus.

FIG. 4 shows a front view of the present bending machine 1. The bending machine 1 has two side parts 4, which are spaced apart from one another by the longitudinally extended 7 machine table 5. A press beam 6 is disposed so as to be guided in the side parts 4, which beam can be moved relative to the side parts 4, driven by a drive means 24. The movement direction 8 and the longitudinal expanse 7 define a working plane 9; normal to this, the longitudinal expanse 7 and a flat side 10 of the machine table 5 or a lower tool 11 disposed in the machine table 5 define an insertion plane 12.

A projector 16 is disposed in the rear machine space and above the insertion plane 12; furthermore, a reflector 18 is disposed in the working and manipulation space and also above the insertion plane 12, wherein the reflector 18 is preferably disposed in a holding apparatus 22. The holding apparatus 22 can also be configured as a pivoting apparatus, as described in FIGS. 2 and 3.

According to an embodiment as described in FIG. 2, a light beam path is guided onto a first reflective surface of the reflector 18 by the projector 16, and deflected by the former in the direction of a surface that is oriented horizontally or approximately horizontally. In particular, onto a flat side of the inserted sheet-metal part 15 and/or an upper flat side 10 of the machine table 5 and/or onto the floor 25 in front of the bending machine 1.

In addition, the reflector 18 can be configured so that it can pivot about an axle 23, so that a reflector 18 having a first reflective surface can be projected onto a display surface 26 on the press beam, a display surface 37 on the upper tool 27, as well as a representation on the sheet-metal part 15, onto the flat side 10 of the machine table 5, alternatively or one after the other, in terms of time. Furthermore, however, it is also possible that the display surface 38 is formed on the floor 25 in front of the bending machine 1. However, it is also possible that projection takes place onto multiple display surfaces at the same time, in particular onto display surfaces oriented horizontally and vertically, at the same time, wherein the great distortions of the projected image that occur in this regard, during generation of the image, can be corrected by a control unit, not shown, so as to nevertheless be able to project an image that is not distorted, to the greatest possible extent.

In the case of an embodiment of the reflector 18 divided in two, in particular having a first and second reflective surface, it is ensured that a projection both onto horizontal surfaces 15, 10, 25 and onto vertical display surfaces 26, 37 is possible at the same time. The two-part embodiment particularly prevents the great image distortions that occur otherwise.

According to a further embodiment, it can be provided that the projector 16 and/or the reflector is/are disposed in a guide 28, so as to be longitudinally displaceable, which guide is disposed and oriented parallel to the longitudinal expanse 7, so as to be moved in the direction of the longitudinal expanse 7 by a drive means 29 of the guide 28, for example. In this way, it is possible to display the representation of the bending information, in particular the position of the next insertion or processing step to the user.

Figure 5:
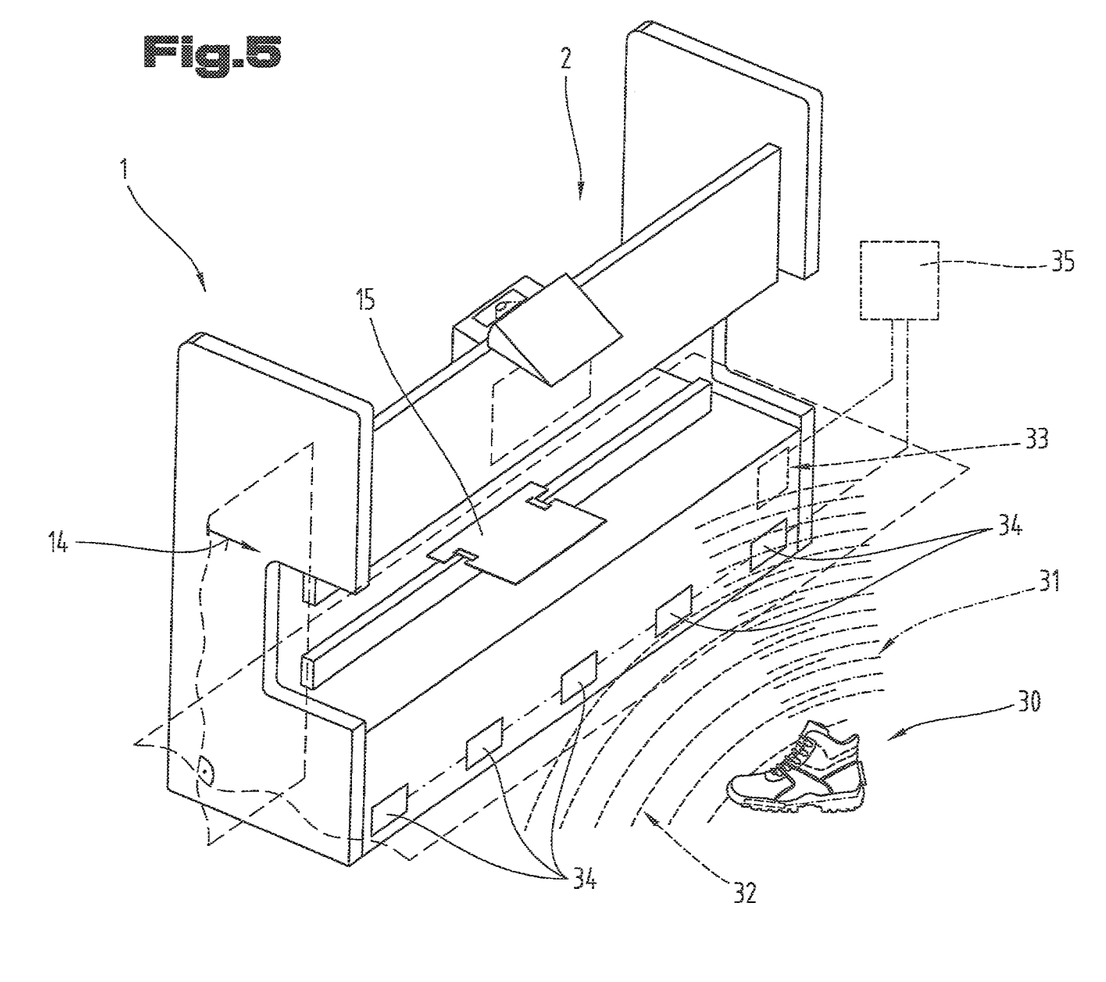
FIG. 5 a further embodiment variant of the bending machine with a bending information display apparatus.

FIG. 5 shows a further possible embodiment in the case where a position-locating apparatus and/or command issuance apparatus 30 is connected with the machine controller 35. Preferably, the position-locating apparatus and/or command issuance apparatus 30 is formed by a shoe. In this regard, the apparatus 30 is connected with at least a first 33 and a second 34 counter-location, by way of a first 31 and a second 32 communication connection. The first communication connection 31 is preferably a wireless connection; the second communication connection 32 is preferably an ultrasound connection. By determining the running time differences between the signals on the first 31 and second 32 communication connection, it is possible for the machine controller 35 to determine the position of the shoe and thereby the position of the operator in the working and manipulation space 14 in front of the bending machine 1. Manipulation work on the inserted sheet-metal part 15 make positioning of the operator to the right or left of the inserted sheet-metal part 15 necessary. By having knowledge of the position of the shoe as a position-locating apparatus and/or command issuance apparatus 30, the bending information display apparatus 2 can be controlled by the machine controller 35 in such a manner that the information to be represented is represented on the correct side of the sheet-metal part 15.

The particular advantage of the present bending machine with a bending information display apparatus now lies in that the bending information display apparatus can be structured in simple manner and with standard components, and is protected against damage during proper operation of the bending press. Furthermore, it is advantageous that the information can be represented to a machine operator in targeted and location-directed manner.

In conclusion, it should be stated that in the different embodiments described, the same parts are provided with the same reference symbols or the same component designations, wherein the disclosures contained in the description as a whole can be applied analogously to the same parts having the same reference symbols or the same component designations. Also, the position information selected in the description, such as at the top, at the bottom, on the side, etc., relate to the figure being directly described and shown, and this position information must be applied analogously to a new position in the case of a change in position.

Further embodiments of the bending machine with a bending information display apparatus, which might be independent in and of themselves, are shown in FIGS. 3 and 4, wherein once again, the same reference symbols or component designations are used for the same parts as in the preceding figures. In order to avoid unnecessary repetition, reference is made to the detailed description in the preceding figures, i.e. this is pointed out.

The exemplary embodiments show possible embodiment variants of the bending machine with a bending information display apparatus, wherein it should be noted at this point that the invention is not restricted to the embodiment variants that are specifically represented, but rather, instead, various combinations of the individual embodiment variants with one another are possible, and this variation possibility lies within the ability of a person skilled in the art and working in this technical field, on the basis of the teaching concerning technical action.

Furthermore, individual characteristics or combinations of characteristics of the different exemplary embodiments shown and described can also represent independent inventive solutions or solutions according to the invention.

The task underlying the independent inventive solutions can be derived from the description.

All information regarding value ranges in the present description should be understood to mean that these include any and all partial ranges of them; for example, the information 1 to 10 should be understood to mean that all partial ranges, proceeding from the lower limit 1 and also including the upper limit 10 are also included; i.e. all partial ranges start with a lower limit of 1 or more and end at an upper limit of 10 or less, for example 1 to 1.7, or 3.2 to 8.1, or 5.5 to 10.

Above all, the individual embodiments shown in FIGS. 3, 4, and 5 can form the object of independent solutions according to the invention. The tasks and solutions in this regard, according to the invention, can be derived from the detailed descriptions of these figures.

For the sake of good order, it should be pointed out, in conclusion, that for a better understanding of the structure of the bending machine with a bending information display apparatus, this machine and its components were shown not to scale, in part, and/or increased and/or reduced in size.

REFERENCE SYMBOL LISTING 1 bending machine
2 bending information display apparatus
3 machine frame
4 side part
5 machine table
6 press beam
7 longitudinal expanse
8 movement direction
9 working plane
10 flat side
11 lower tool
12 insertion plane
13 machine space
14 working and manipulation space
15 sheet-metal part
16 projector
17 light beam path of the projector
18 reflector
19 first reflective surface
20 light beam path of the projector
21 second reflective surface
22 holding apparatus
23 axle
24 drive means
25 floor
26 display surface
27 upper tool
28 guide
29 drive means
30 position-locating apparatus and/or command issuance apparatus
31 first communication connection
32 second communication connection
33 first counter-location
34 second counter-location
35 machine controller
36 bending line
37 display surface
38 display surface

The invention claimed is:

1. A bending machine with a bending information display apparatus for display of bending information,
wherein the bending machine has a machine frame and a longitudinally extended machine table, fixed in place, and a longitudinally extended press beam, which press beam is guided in the machine frame and held by a first drive means, so as to be movable relative to the machine frame, and
wherein the longitudinal expanse and the movement direction of the press beam define a working plane, and furthermore, an insertion plane is defined essentially normal to the working plane and by an upper flat side of the machine table or of a lower tool disposed on the machine table, and
wherein the machine frame furthermore has two side parts, which are spaced apart from one another by a machine width in the direction of the longitudinal expanse of the machine table and of the press beam, and
wherein the working plane establishes a front working and manipulation space and a rear machine space, distinguished from the front working and manipulation space,
wherein
a projector is disposed in the rear machine space and above the insertion plane, which projector has a light beam directed away from the insertion plane, and
wherein a reflector having a first reflective surface is disposed in the working and manipulation space, which first reflective surface is disposed so as to be pivoted by an angle relative to the horizontal, so that the light beam impacting the first reflective surface departs from the first reflective surface as a departing light beam of the reflector in the direction of the insertion plane.

2. The bending machine according to claim 1, wherein at least one of the projector and/or and the reflector is pivotally mounted on the machine frame to orient the light beam over a section along the longitudinal expanse.

3. The bending machine according to claim 1, wherein at least one of the projector and the reflector is disposed on a region of the side parts or in the region of the side parts.

4. The bending machine according to claim 1, wherein the machine table and/or a metal sheet to be formed, which is disposed in the insertion plane, and/or a floor surface in the front working and manipulation space and/or a surface of a bending tool disposed in the press beam form a first display surface.

5. The bending machine according to claim 4, wherein the reflector has a second reflective surface, wherein the first and the second reflective surface are disposed within the light beam of the projector, and surface normal line vectors of the two surfaces enclose an angle relative to one another.

6. The bending machine according to claim 5, wherein the press beam forms a second display surface.

7. The bending machine according to claim 6, wherein at least one of the first display surface and the second display surface is configured at discrete positions along the longitudinal expanse.

8. The bending machine according to claim 1, wherein at least one of the projector and the reflector is disposed, in movable manner, in a guide that is disposed oriented parallel to the longitudinal expanse.

9. The bending machine according to claim 8, wherein at least one of the projector and the reflector is connected with the guide so as to move, by way of a second drive means.

10. The bending machine according to claim 1, wherein the reflector is disposed in a holding apparatus comprising an axle, which holding apparatus is movable between a protection position and a work position.

11. The bending machine according to claim 10, wherein the holding apparatus is disposed behind the working plane in the protection position.

12. The bending machine according to claim 10, wherein the holding apparatus is disposed above the projector in the protection position.

13. The bending machine according to claim 10, wherein the projector is formed by a laser having a deflection unit.

14. The bending machine according to claim 1, wherein the projector is connected with a machine controller and/or a process guide system, and wherein a data-technology connection exists with a work preparation system or CAD system.

15. The bending machine according to claim 14, wherein at least one of a position-locating apparatus and a command issuance apparatus is connected with the machine controller.

16. The bending machine according to claim 15, wherein the connection is configured to be wireless.

17. The bending machine according to claim 15, wherein the position-locating apparatus and/or a command issuance apparatus is formed by an article of clothing.

18. The bending machine according to claim 1, wherein the bending information is formed by at least one of the group of workpiece contour, bending line, control panel, status data of the press beam, orientation information, reference angle, piece counter, and regions on the sheet metal to be formed that have an increased risk of injury during the bending process.

19. The bending machine according to claim 1, wherein the bending information comprises animated orientation information.

* * * * *

UNITED STATES PATENT AND TRADEMARK OFFICE
CERTIFICATE OF CORRECTION

PATENT NO. : 11,344,988 B2
APPLICATION NO. : 16/325986
DATED : May 31, 2022
INVENTOR(S) : Gerhard Angerer et al.

It is certified that error appears in the above-identified patent and that said Letters Patent is hereby corrected as shown below:

In the Claims

In Column 12, Line 20 Line 2 of Claim 2 after "projector" delete "and/or"

Signed and Sealed this
Fifth Day of July, 2022

Katherine Kelly Vidal
*Director of the United States Patent and Trademark Office*